United States Patent [19]

Nagata

[11] Patent Number: 5,605,276
[45] Date of Patent: Feb. 25, 1997

[54] SOLDERING METHOD AND SOLDERING APPARATUS

[76] Inventor: Eishu Nagata, 453-23, Wakabadai, Nagareyama-shi, Chiba 270-01, Japan

[21] Appl. No.: 493,246

[22] Filed: Jun. 22, 1995

[30] Foreign Application Priority Data

Jul. 7, 1994 [JP] Japan .................. 6-177719

[51] Int. Cl.⁶ .................. B23K 3/06; B23K 1/00
[52] U.S. Cl. .................. 228/257; 228/180.1; 228/33
[58] Field of Search .................. 228/8, 33, 102, 228/180.1, 256, 257; 222/591

[56] References Cited

U.S. PATENT DOCUMENTS

| | | | |
|---|---|---|---|
| 5,038,995 | 8/1991 | Nagata | 228/33 |
| 5,238,176 | 8/1993 | Nishimura | 228/33 |
| 5,297,718 | 3/1994 | Nagata | 228/102 |
| 5,361,963 | 11/1994 | Ozawa et al. | 228/8 |
| 5,364,011 | 11/1994 | Baker et al. | 228/33 |

FOREIGN PATENT DOCUMENTS

| | | |
|---|---|---|
| 0578218 | 12/1993 | European Pat. Off. . |
| 3404945 | 8/1985 | Germany . |
| 46-34209 | 10/1971 | Japan . |
| 50-77427 | 7/1975 | Japan . |
| 62-270272 | 11/1987 | Japan . |

OTHER PUBLICATIONS

Patent Abstracts of Japan, vol. 10 No. 238 (M–508), Aug. 16, 1986, & JP–A–61 071174 Apr. 12, 1986, *abstract

*Primary Examiner*—Samuel M. Heinrich
*Attorney, Agent, or Firm*—Sughrue, Mion, Zinn, Macpeak & Seas

[57] ABSTRACT

The improvement in the soldering method comprising the steps of feeding a predetermined volume of solid solder to a solder melting pot, heating and melting the solder in the pot, and then dropping the molten solder onto a workpiece. A wire solder is held between at least one pair of endless running belts which run with opposed faces thereof in contact with each other thereby to straighten the wire solder. The tip-end of the straightened wire solder is pressed against the solder melting pot to melt the wire solder from the tip-end. On completion of feeding a predetermined volume of the wire solder, the running belts are run in reverse to retreat the tip-end of the wire solder from the solder melting pot. A soldering apparatus for realizing the aforementioned method is also provided.

10 Claims, 12 Drawing Sheets

SOLDERING METHOD AND SOLDERING APPARATUS

BACKGROUND OF THE INVENTION

1. Field of the Invention

The present invention relates to a soldering method and soldering apparatus for dropping molten or semi-molten solder (hereinafter referred to simply as molten solder) on a workpiece to effect soldering.

2. Prior Art Statement

Japanese Patent Publication No. 34209/1971 discloses a soldering apparatus for applying molten solder onto a desired point or area of a workpiece, such as a printed circuit board, wherein a conical pot is used for melting a solid solder. A wire solder is cut and fed to the conical pot to be melted therein and the molten solder is allowed to drop through a hole provided at the bottom of the pot. However, this type of soldering apparatus has a problem that some portion of the solid solder drops through the hole in the unmelted state while the other portion of the solder is dropped in the overheated condition, since it is impossible to retain the whole solid solder for a constant time, resulting in uneven and unreliable soldering.

Unexamined Japanese Utility Model Publication No. 77427/1975 discloses a soldering apparatus having a conical melting pot provided with a needle valve at the bottom of the pot. In this know apparatus, a molten mass of solder is contained in the conical melting pot, and a constant volume of the molten solder is allowed to drop through the needle valve. However, due to surface tension of the molten solder, it becomes impossible to control the volume of dropping molten solder precisely particularly when the volume of molten solder to be applied onto the workpiece is relatively small, as is the case where the workpiece is a printed circuit board.

In order to solve the aforementioned problems of the known apparatuses, the inventor of this invention has previously proposed an improvement in soldering in my earlier Japanese Patent Application No. 110505/1986 which has been published as JP-A-62-270272. According to my previous proposal, a solder melting pot is formed by plural trowel members which engage with each other to hold a solid solder tip or piece for a pre-set time to melt the same and then they are separated to allow the molten solder to drop onto a desired point or area of a workpiece.

However, in the method according to my prior proposal, the time for falling the solid solder piece from the solder cutter to the solder melting pot cannot be controlled so that it becomes hard to control the temperature of the molten solder in the solder melting pot to a constant temperature.

To solve the aforementioned problem, the inventor of this application has proposed another method in which a solder piece cut from a wire solder to have a constant length (i.e. constant volume) is tentatively received in a cradle to hold the same in the stationary condition, and then the cradle is inverted to allow the solder piece to drop through a tubular solder piece guide into a solder melting pot (Unexamined Japanese Patent Publication No. 2-182373, which corresponds to U.S. Pat. No. 5,038,995 and EP-0378369B).

However, even in the method according to my later proposal, there is a problem that the time cost for dropping the solder piece cannot be controlled to a constant time since the solder piece dropping from the cradle often contacts with the interior wall of the solder piece guide to change the dropping condition. Since the timing from which the solder piece begins to drop is detected and it is estimated that the solder piece is melted in the solder melting pot after the lapse of a constant time duration from that timing, the heating time for melting the solder piece is differentiated from the thus estimated time when the time cost for dropping the solder piece from the cradle to the solder melting pot is changed. This leads to temperature fluctuation of the molten solder from the optimum temperature so that false soldering, such as knotty or tubercled soldering, is resulted when the temperature of molten solder is lower than the optimum temperature or the molten solder is deteriorated in quantity when the temperature thereof is higher than the optimum temperature.

To solve the aforesaid problem, the inventor of this application has proposed a further method wherein melting of a solder piece in the solder melting pot is detected by sensing, for example, the light reflected by the surface of molten solder mass, and wherein the time duration for melting the solder and the temperature of molten solder are controlled (Unexamined Japanese Patent Publication No. 5-343842, which corresponds to U.S. Pat. No. 5,297,718 and EP-0574218A).

According to the above-mentioned practice, a wire solder is cut to make the solid solder piece having a predetermined length, and thus solid solder piece is fed to the solder melting point. However, this practice involves a problem that particularly when a flux coated or cored wire solder is cut, the residing flux sticks to the surrounding portions of a solder cutter and a solder feeder to prevent a smooth feed of the solid solder piece. There is also a problem that smoke generated from molten solder and flux deteriorates the sensitivity of a photosensor.

OBJECTS AND SUMMARY OF THE INVENTION

Accordingly, a first object of this invention is to provide a soldering method wherein a predetermined volume of solid solder can be precisely fed for soldering and wherein a small volume of molten solder maintained at the optimum temperature is allowed to drop onto a workpiece to effect even soldering in a reliable condition.

A second object of this invention is to provide a soldering apparatus used for realization of such a soldering method.

According to the present invention, the first object is attained by the provision of an improvement in the soldering method comprising the steps of supplying a predetermined volume of solid solder to a solder melting pot, heating and melting the solder in said solder melting pot, and then dropping the molten solder onto a workpiece, wherein a wire solder is held between at least one pair of endless running belts which run with opposed faces thereof in contact with each other thereby to straighten the wire solder, wherein a fore tip-end of the straightened wire solder fed by the running belts is abutted and pressed against said solder melting pot to melt the wire solder from the tip-end, and wherein on completion of feeding a predetermined volume of the wire solder to said solder melting pot, said running belts are run in reverse to retreat the tip-end of the wire solder from said solder melting pot.

Preferably, a sensor for sensing the fore tip-end of the wire solder is provided near the running belts on the side of a wire solder feeding end thereof, and after a predetermined volume of the wire solder has been fed for soldering, the tip-end of the wire solder is retracted or retreated to the sensor position. Also, preferably, the tip-end of the wire solder is vibrated, for example, by finely alternating running directions of the running belts to shake off remaining molten solder from the tip-end of the wire solder thereby to allow the remaining molten solder to drop into the solder melting pot.

The second object of the invention is attained by the provision of an improvement in the soldering apparatus which carries out the steps of feeding a predetermined volume of solid solder to a solder melting pot, heating and melting the solder in said solder melting pot, and then dropping the molten solder onto a workpiece, said apparatus comprising: a feeder assembly for feeding a wire solder to said solder melting pot and comprising at least one pair of endless running belts which run with opposed faces thereof in contact with each other, said wire solder being held between said running belts and straightened along with the feeding operation of said wire solder by said running belts, thus straightened wire solder being fed to said solder melting pot; and a controller which controls said running belts to feed the tip-end of the wire solder to said solder melting pot, to further feed the wire solder by a length corresponding to a predetermined feed of solder, and then to retreat the wire solder.

Preferably, the feeder assembly is provided with a sensor near a wire solder feeding end thereof for sensing the foremost tip-end of the wire solder, and after a predetermined volume of the wire solder has been fed for soldering, the tip-end of the wire solder is retracted or retreated to the position of the sensors. The solder melting pot is formed of plural, for example, two trowel members which engage with each other. The trowel members are opened to allow molten solder to drop onto a workpiece. The solder melting pot may be formed of one trowel member.

The feeder assembly may be further provided with a pair of rollers near a pair of the running belts on the upstream side thereof, in which rollers are oriented perpendicular to the running belts so as to straighten the wire solder more precisely. Another pair of running belts may be used in place of the rollers.

BRIEF DESCRIPTION OF THE DRAWINGS

The above and other objects and advantages of the invention becomes apparent from the following description of presently preferred embodiments illustrated, by way of example only, in the appended drawings in which.

EMBODIMENTS OF THE INVENTION

Presently preferred embodiments of the present invention will now be described in detail with reference of the appended drawings.

Figure 1:
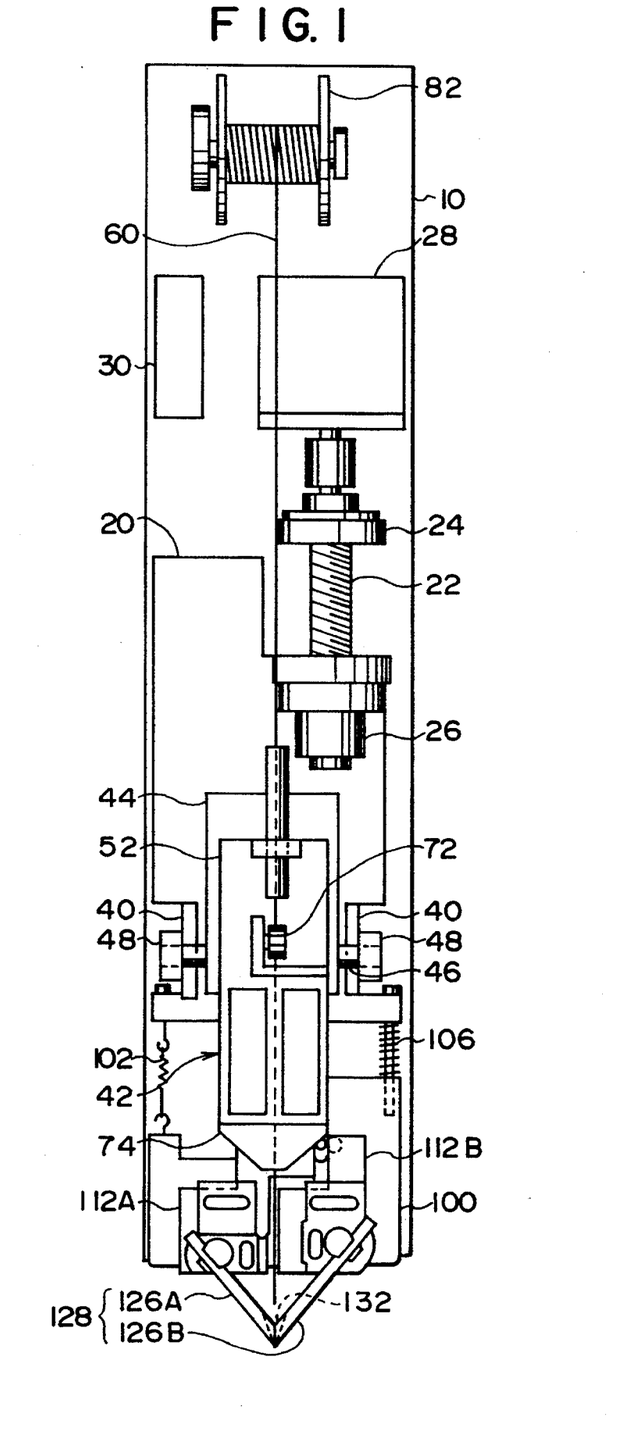
FIG. 1 is a front view of an embodiment of a soldering apparatus according to the invention.
Figure 2:
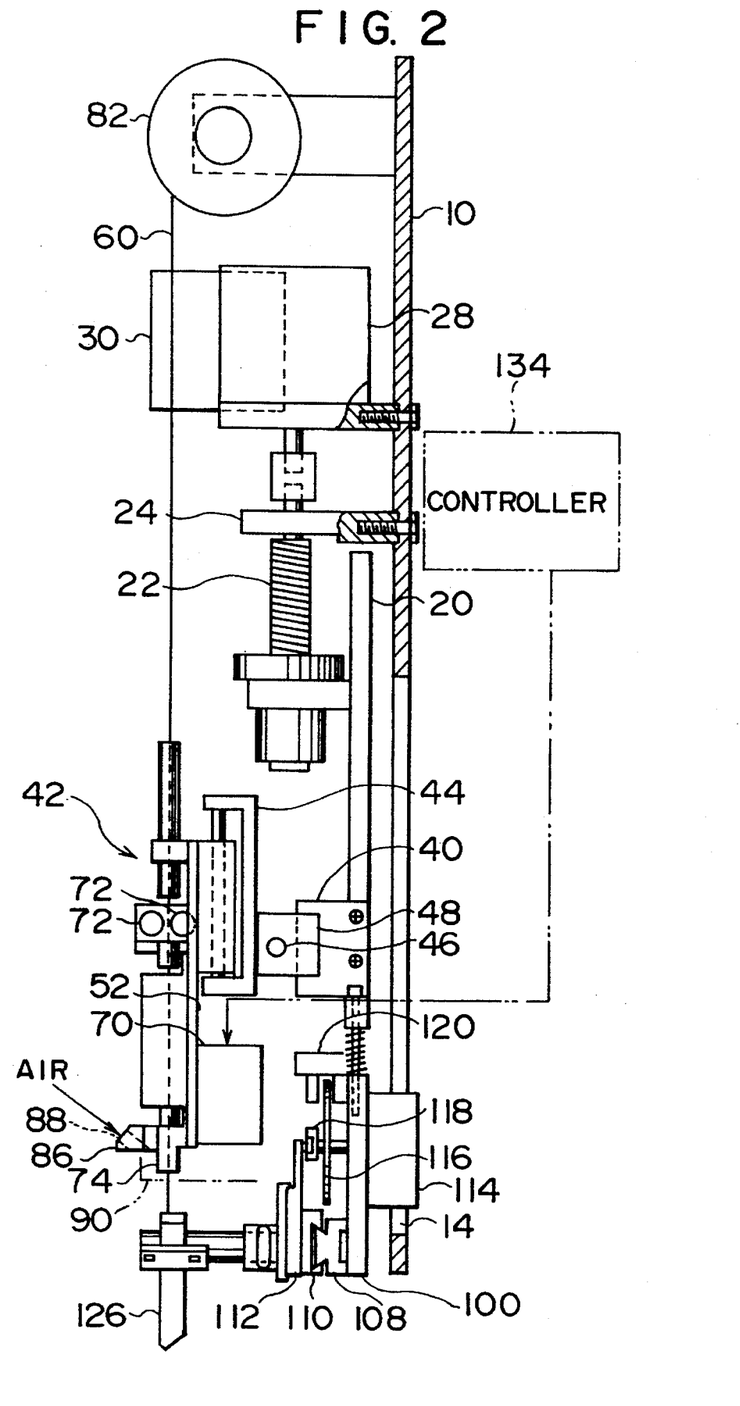
FIG. 2 is a side elevation of the embodiment shown in FIG. 1.
Figure 3:
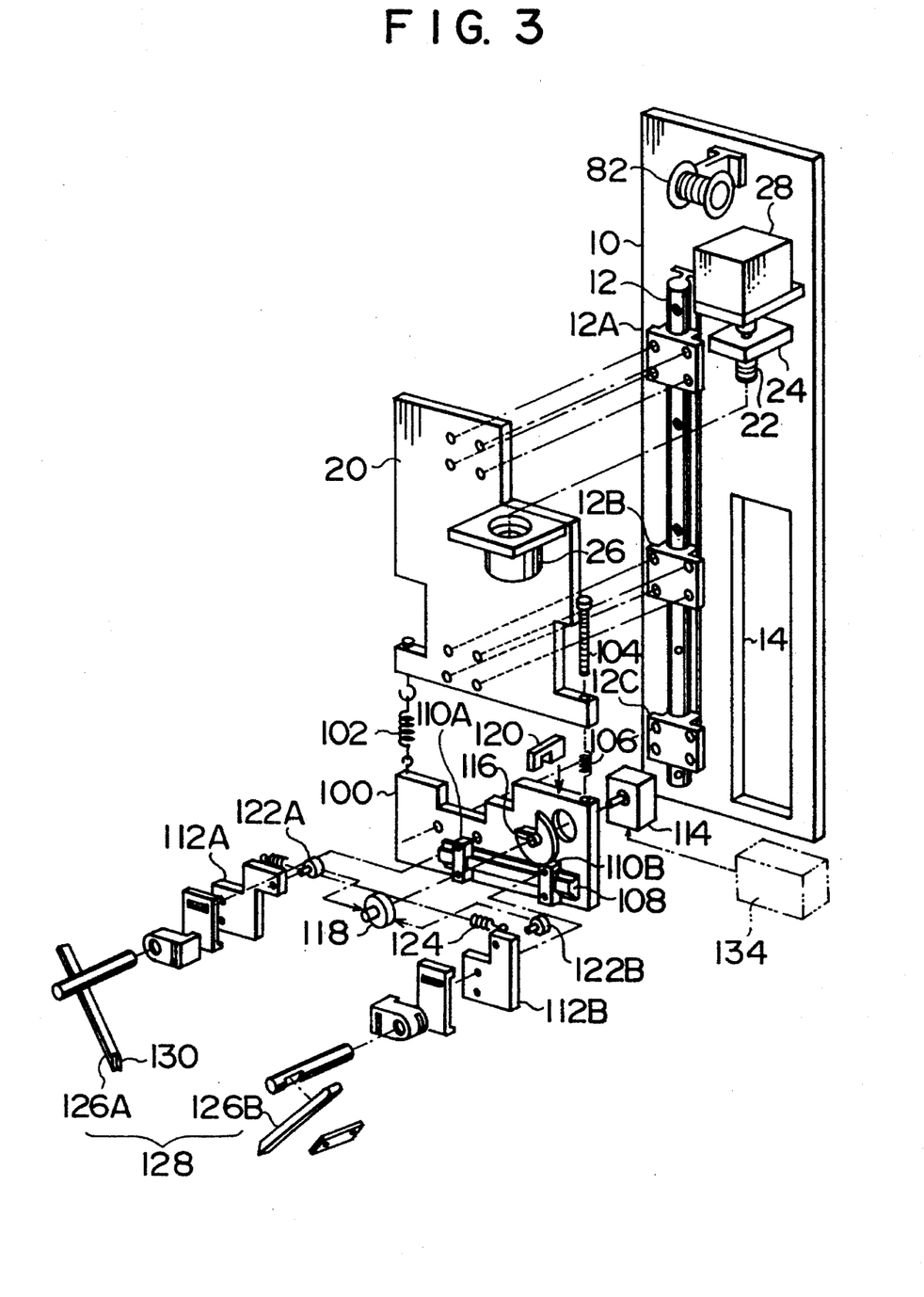
FIG. 3 is an exploded view showing parts of the embodiment shown in FIG. 1.
Figure 4:
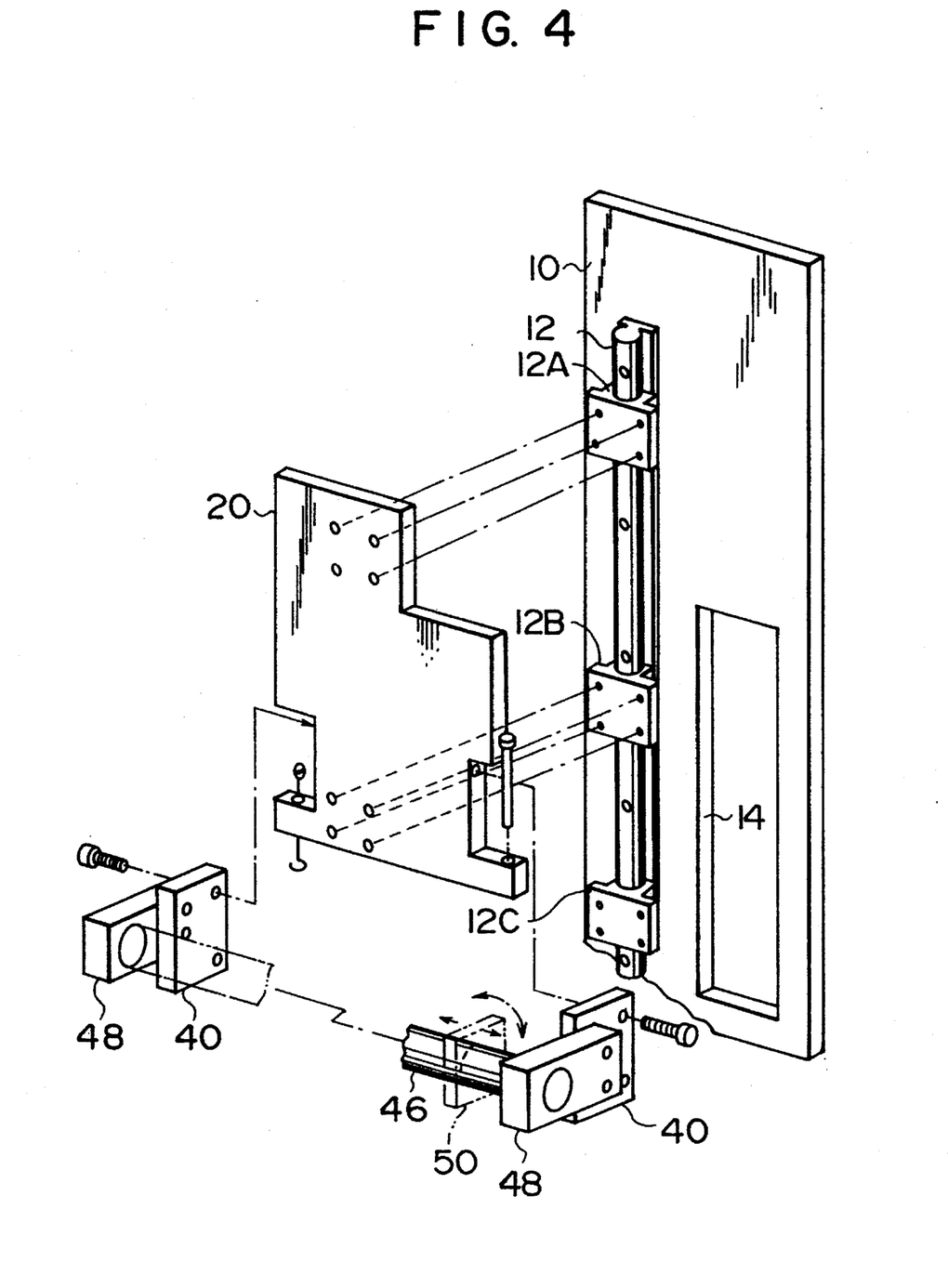
FIG. 4 is a further exploded view showing parts of the embodiment shown in FIG. 1.

Initially referring to FIGS. 1 to 4, an elongated carrier plate is denoted by reference numeral 10 and fixed to a not-shown stand to extend in the vertical direction. As shown in FIGS. 3 and 4, a linear bearing track 12 is fixed on one side of the carrier plate 10 to extend vertically, and three movable blocks 12A, 12B and 12C are movably mounted on the track 12. Each of the movable blocks 12A to 12C contains a bearing and is moved smoothly along the track 12 in the vertical direction without rotating around the track 12. An elongated window or opening 14 is formed through the carrier plate 10 at the right side as viewed in FIGS. 3 and 4.

An upper movable plate 20 is fixed to the uppermost and intermediate movable blocks 12A and 12B to move in the vertical direction. A feed screw 22 extends in the vertical direction and has an upper end fixedly held by a bearing holder 24 which is fixed at an upper right portion of the carrier plate 10, the feed screw being thrust into a nut holder 26 fixed to the movable plate 20. The feed screw 22 is rotated by a stepping motor 28 secured to an upper portion of the carrier plate 10. As the feed screw 22 rotates, the upper movable plate 20 which is integrally fixed to the nut holder 26 is moved in the vertical direction.

A fan motor 30 is provided at the left side (as viewed in FIGS. 1 and 2) of the motor 28. The top, front, left and right sides of the assembled soldering apparatus are covered by a cover plate (not shown), and the carrier plate 10 serves as a backing plate. Fresh air is introduced by the fan motor 30 into the space covered by the cover plate, and thus introduced air is flown downwards to remove smokes generating from the solder as it is melted.

A pair of right and left solder feeder plates 40, 40 are fixed to the upper movable plate 20. As shown in FIG. 4, the plates 40 are fixedly secured on the right and left end faces of the upper movable plate 20 to extend forwardly. A feeder assembly 42 is mounted on the plates 40, and the feeder assembly 42 straightens a wire solder and feeds the straightened wire solder to a solder melting pot 132 as a solder melting site, which will be described in detail hereinafter, thereby to feed the solder melting pot 132 with a constant volume of solder.

The feeder assembly 42 will now be described. The feeder assembly 42 is mounted on a feeder bracket 44 which is held on the feeder plates 40, 40. The feeder bracket 44 is fixed on a shaft 46 held horizontally by the feeder plates 40, 40 and is adjustable as needed in a horizontal position along and a rotational position about the shaft 46.

In details, the shaft 46 extends between and is held by shaft holders 48, 48 which are fixed to the feeder plates 40, 40 respectively. Sliders 50, 50 (only one slider 50 being shown in FIG. 6) fixed on the back of the feeder bracket 44 are slidably fit to the shaft 46. As will be described later, the feeder assembly 42 is positioned so that the tip-end of a wire solder 60 is directed to the solder melting pot 132, and then the sliders 50, 50 are fixed on the shaft 46 with screws (not shown) thereby to fixedly secure the feeder bracket 44 and the feeder assembly 42.

Figure 6:
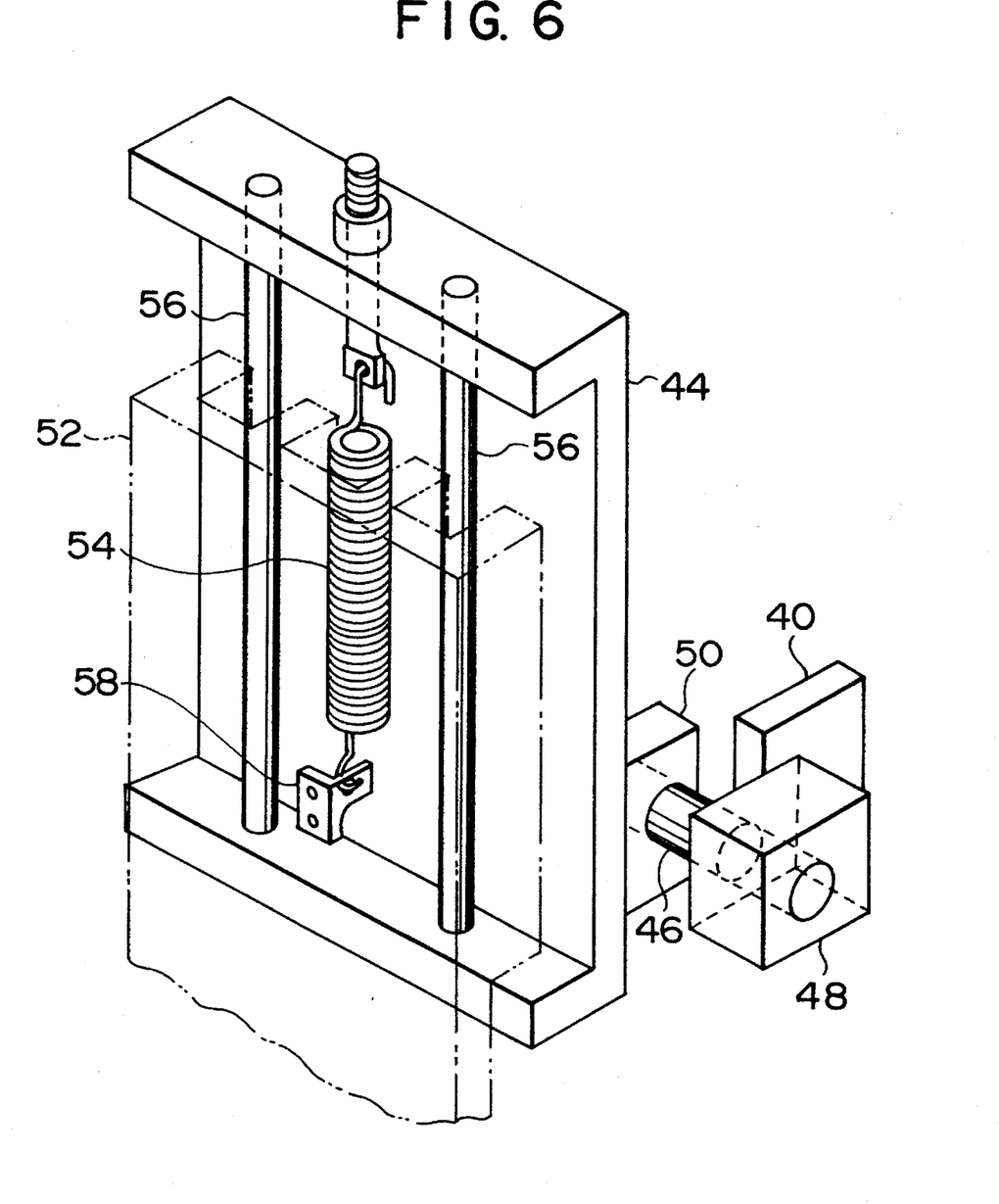
FIG. 6 is a perspective view showing a holder section of the feeder assembly shown in FIG. 5.

Reference numeral 52 denotes a feeder base plate, which is held on the feeder bracket 44 in a vertically slidable manner. In details, as shown in FIG. 6, the feeder bracket 44 has a shape of lying squarish letter U as viewed from its side, has a coil spring 54 suspended from above at the center thereof, and is provided with vertical shafts 56, 56 at both sides thereof. Three square grooves are formed vertically in the back of the feeder base plate 52, and linear bearings (not shown) mounted on the shafts 56, 56 are fit into the square grooves excluding the center square groove.

Accordingly, the feeder base plate 52 is held on the shafts 56, 56 and moves in the vertical direction along the same. As shown in FIG. 6, the top end of the coil spring 54 is anchored to the upper portion of the feeder bracket 44, and the bottom end of the spring 54 is anchored to a hook member 58 fixed on the back of the feeder base plate 52. Thus, the feeder assembly 42 is elastically suspended by the coil spring 54 as spring means.

Hence, a load which the wire solder 60 fed from the feeder assembly 42 applies to the solder melting pot 132 as a result of abutting on the same is reduced by the upward sliding movement of the feeder base plate 52 along the shafts 56, 56. In the case where the tip of the wire solder 60 fails to immediately melt on contact with the solder melting pot 132, the feeder assembly 42 presses the wire solder 60 downward, causing the wire solder 60 to bend if the pressing load is large. In this embodiment, the feeder assembly 42 as a whole slides upward to reduce the load imposed on the wire solder 60 and therefore the bending or warp of the wire solder 60 can be prevented.

Since the weight of the feeder assembly 42 is relatively large, the weight, if applied directly, will cause the wire solder 60 to bend. To avoid this problem, the feeder assembly 42 is suspended by spring means comprising the coil spring 54. For example, when the feeder assembly 42 weighs about 1 kg and when the wire solder 60 has a diameter of about 1.0 mm, the coil spring 54 is preferably set so as to generate a lifting force of about 800 g. As a result, a load imposed on the wire solder 60 is only about 200 g, and thus the wire solder 60 is prevented from bending.

While the wire solder 60 pressed against the solder melting pot 132 is undergoing melting, the feeder assembly 42 continues pressing the tip-end of the wire solder 60 against the solder melting pot 132 by a pressure which is a differential force between the weight of the feeder assembly 42 and the lifting force of the coil spring 54. Accordingly, the wire solder 60 can continue melting without bending.

On completion of feeding a predetermined volume of the wire solder 60, the wire solder 60 returns back to the feeder assembly 42 and thereby the tip-end of the wire solder 60 draws away from the solder melting pot 132. Then, through an action of the coil spring 54, the feeder assembly 42 gently lowers back to a reference position, i.e. a lower limit position of a travel of the feeder base plate 52.

Figure 5:
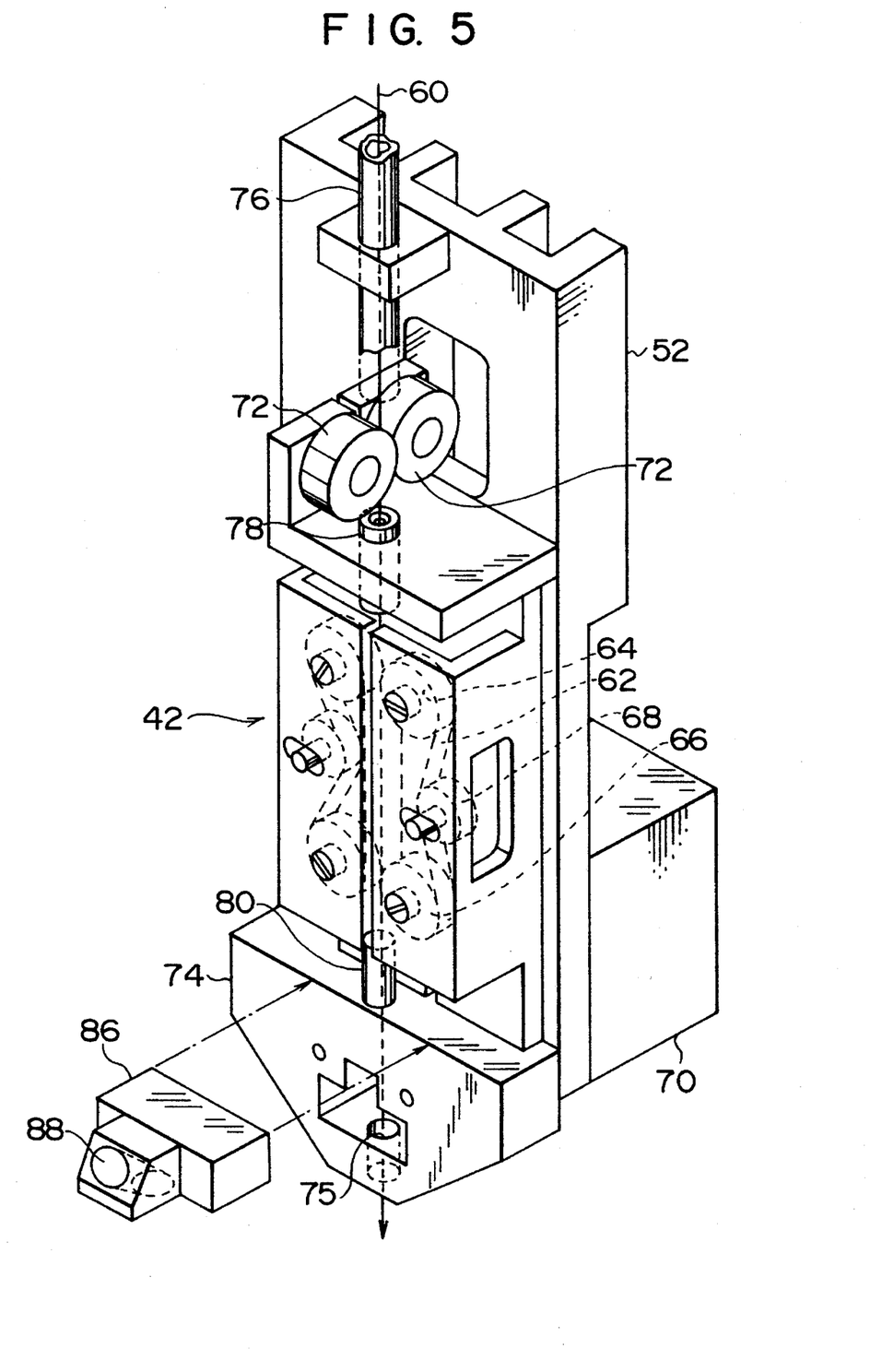
FIG. 5 is a perspective view showing a feeder assembly.
Figure 7:
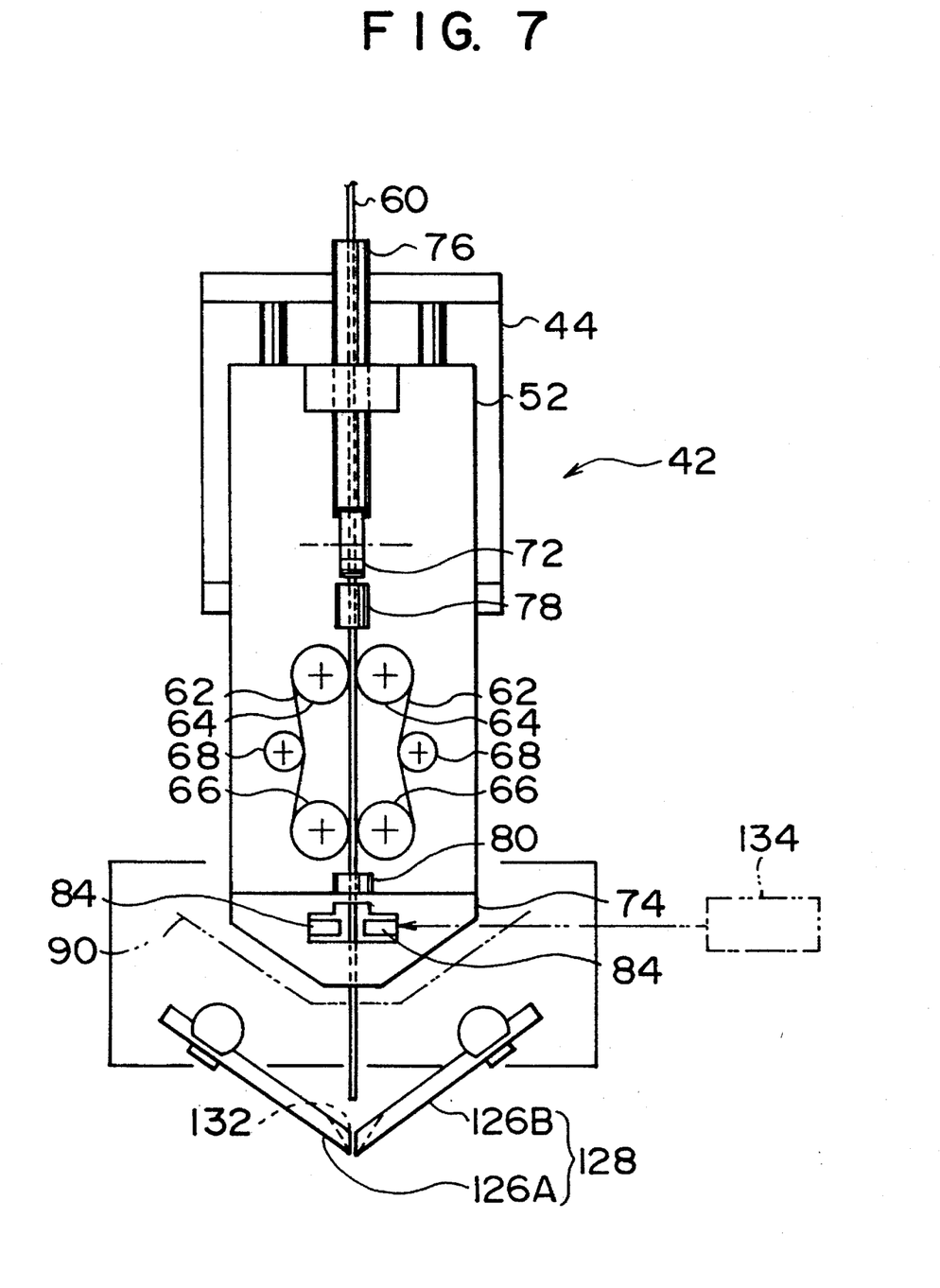
FIG. 7 is a front view showing how a wire solder is fed by the feeder assembly shown in FIG. 5.
Figure 8:
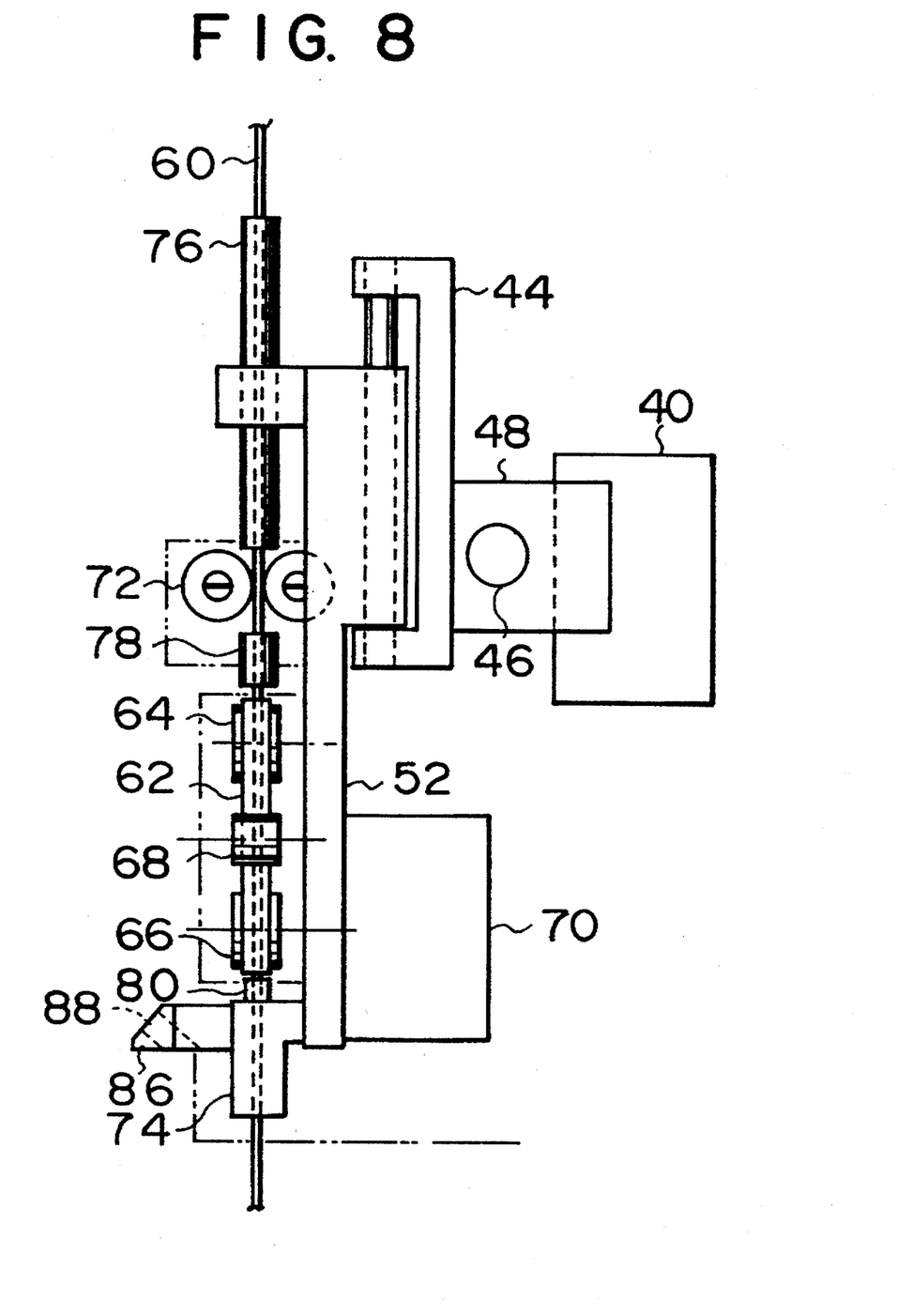
FIG. 8 is a side elevation showing how the wire solder is fed by the feeder assembly shown in FIG. 5.

As shown in FIGS. 5, 7 and 8, a pair of endless running belts 62, 62 are provided on the front of the feeder base plate 52. The endless running belts 62, 62 hold the vertical wire solder 60 from both sides and run in the vertical direction in such a manner as to contact each other. In details, each of the running belts 62, 62 runs along a path defined by an upper roller 64 and a lower roller 66, and an idle roller 68 contacts with the surface of the belt 62 and applies a predetermined tension thereto. The lower rollers 66 are controlled to be rotated regularly and reversely by a servomotor 70. The running belts 62 may be made of synthetic resin, urethane rubber, metal or the like.

A pair of rollers 72, 72 are mounted on the feeder base plate 52 at the upper position of the running belts 62, 62 to hold the wire solder 60 therebetween in the front-rear direction as viewed in FIG. 5. A feeder head 74 is mounted on the feeder base plate 52 beneath the running belts 62, 62. Guide tubes 76, 78, 80 are located in the order from above along a vertical line which is a passage of the wire solder 60.

The wire solder 60 is drawn down in a substantially vertical direction from a reel 82 which is held horizontally with the carrier plate 10 at the upper portion thereof. Then, the wire solder 60 is led downward through the guide tube 76, between the opposing rollers 72, 72, through the guide tube 78, between the running belts 62, 62, and through the guide tube 80 and the feeder head 74 in the order. The wire solder 60 runs through between the rollers 72, 72 to undergo the curing of a wire's warp or bend in the front-rear direction as viewed in FIGS. 5 and 8. Also, the wire solder 60 runs through between the contacted opposing running belts 62, 62 to undergo the curing of the wire's warp or bend in the right-left direction as viewed in FIGS. 5 and 7. The wire solder 60 restored to straightness by such curing operation is fed downward and straightforward through a guide hole 75 in the feeder head 74.

Sensors 84, 84 are located opposed each other in the feeder head 74 with the wire solder 60 running therebetween (see FIG. 7). One of the sensors 84, 84 is a light emitting element, and the other is a light receiving element, i.e., a photosensor. They are used to sense the passage of the tip-end of the wire solder 60. An air tube holder 86 is disposed to the front surface of the feeder head 74. The air tube holder 86 is provided with an air inlet port 88 directed to the sensors 84, 84 (see FIGS. 5 and 8).

Figure 9:
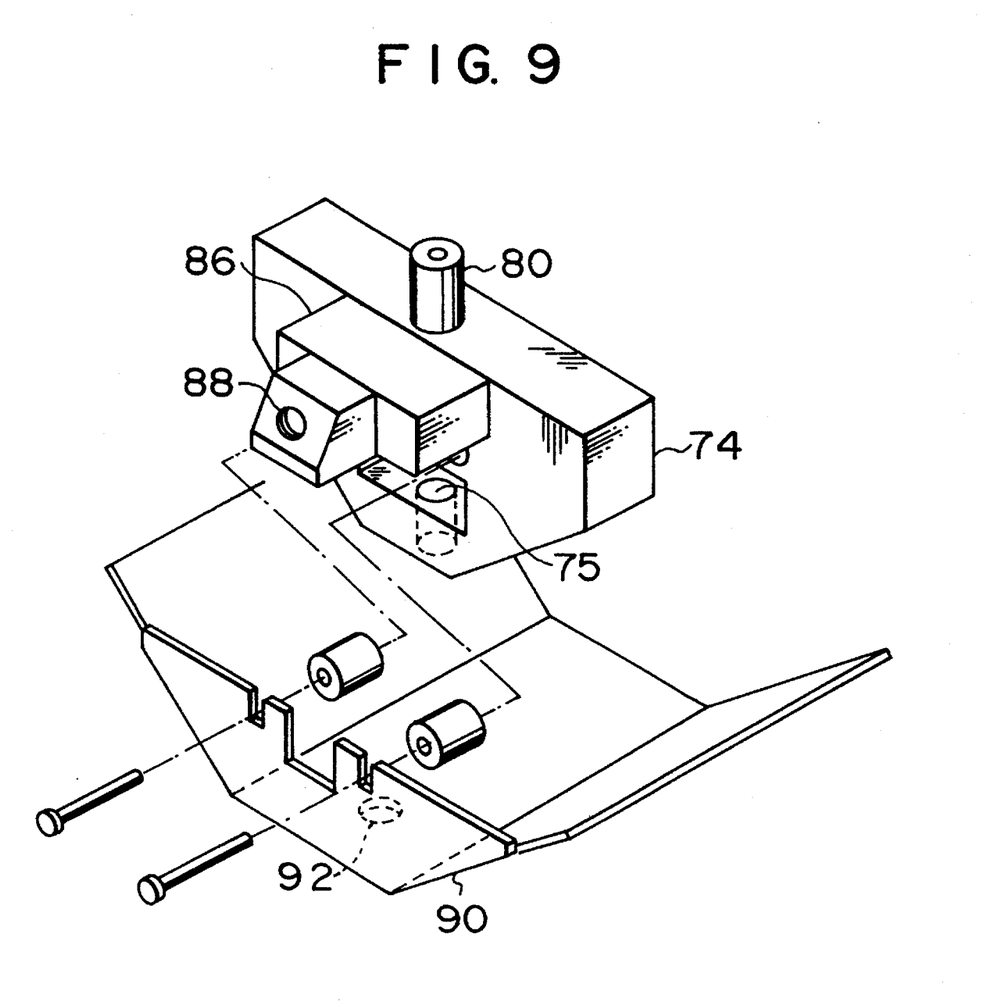
FIG. 9 is an exploded view showing the details of a head of the feeder assembly.

A not-shown air tube is connected to the air inlet port 88 to supply air to the sensors 84 thereby to prevent the smoke generated from molten solder from sticking to the sensors 84. As shown in FIG. 9, an under-cover 90 is fixed to the feeder head 74. The under-cover 90 covers the lower portion of the feeder head 74 to prevent the smoke generated from molten solder from sticking to the inner surface of a guide bore 75 in the feeder head 74 and to the sensors 84. Of course, the under-cover 90 is provided with a hole 92 (see FIG. 9) through which the wire solder 60 runs.

The details of the trowel members 126 which come together to form the solder melting pot 132 will now be described. In FIG. 3, reference numeral 100 designates a lower movable plate. The lower movable plate 100 is secured to the movable block 12C to be moved in the vertical direction. The left side of the lower or first movable plate 100 is suspended from the upper or second movable plate 20 through a coil spring 102, and the right side thereof is suspended from the upper movable plate 20 through a long bolt 104. As a result, the lower movable plate 100 is moved in the vertical direction together with the upper movable plate 20.

The bolt 104 is slidingly inserted through a bore formed in the upper movable plate 20 so that the lower movable plate 100 is moved upwards together with the trowel members 126 when the trowel members 126 impinge on the surface of the workpiece to prevent damage of the workpiece upon such impingement by the trowel members 126. A compression spring 106 is disposed around the bolt 104 to apply a proper compression force on the trowel members 126 when it is desired to press the trowel members 126 onto the surface of the workpiece.

A slide rail 108 is secured to the lower movable plate 100 and extends horizontally. Movable blocks 110A and 110B are slidingly mounted to the rail 108, and paired trowel member carrier plates 112 (112A, 112B) are fixed to the movable blocks 110A and 110B. A stepping motor 114 is mounted on the back side of the lower movable plate 100 and has a shaft extending forwards through the lower movable plate 100. An encoder cam 116 and a cam 118 are fixedly mounted on the fore end of the shaft of the motor 114.

The encoder cam 116 detects the rotation angle of the motor 114 by a photo-sensor 120. The cam 118 has a generally elliptical contour and symmetrically mounted on the shaft of the motor 114. Cam followers 122 (122A, 122B) mounted to the aforementioned trowel member carrier plates 112 rotatably engage with the cam 118 from the right and left sides. The trowel member carrier plates 112 are biased by a spring 124 to be applied with a force which acts to allow the carrier plates 112 to come close with each other (see FIG. 3).

In the illustrated embodiment, paired trowel members (or soldering iron members) 126 (126A, 126B) are secured to the trowel member carrier plates 112 (112A, 112B) respectively, the angle and position of each trowel member 126 being adjustable. These trowel members 126 extend obliquely from the carrier plates 112 to have their lower ends separably engaged with each other just beneath the wire solder 60 fed from the feeder assembly 42. When these trowel members 126A, 126B come close with each other, they form the soldering iron 128 having a V-shaped section when viewed from the front side. Each trowel member 126 contains a Nichrome wire heater and has a surface made of a material which repels molten solder, such as ceramics, fluorocarbon resin or stainless steel. A silicon nitride ceramic material is particularly preferred, since it is highly resistive to permeation of solder and to chemicals, such as hydrochloric acid, contained in the flux of the solder and also has improved durability.

Grooves 130 are formed on the opposing surfaces of these trowel members 126 (only one groove being shown in FIG. 3) so that a cavity defining the solder melting pot 132 is formed by these grooves 130 when these trowel members 126 come close with each other (see FIGS. 1, 7 and 10). In FIG. 2, reference numeral 134 denotes a controller. The controller 134 controls a volume of the wire solder 60 to be fed and retreated, a vertical movement of the upper movable plate 20, and the opening/closing and heating operations of the trowel members 126.

The operation of the illustrated embodiment will now be described. FIGS. 10A to 10F show an exemplified operation sequence for soldering a lead wire 138 of an electric part 136, such as a resistor, on a printed circuit board 140 from the upside surface of the printed circuit board 140, the end of the lead wire 138 being inserted through a through-hole of the board 140.

Figure 10A:
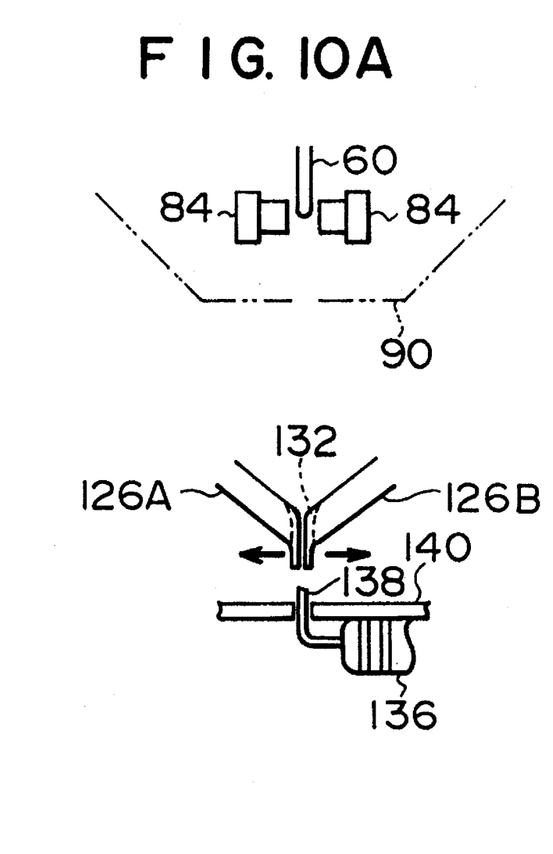
FIGS. 10A to 10F are views showing an exemplified operation of the soldering apparatus of the invention.
Figure 10B:
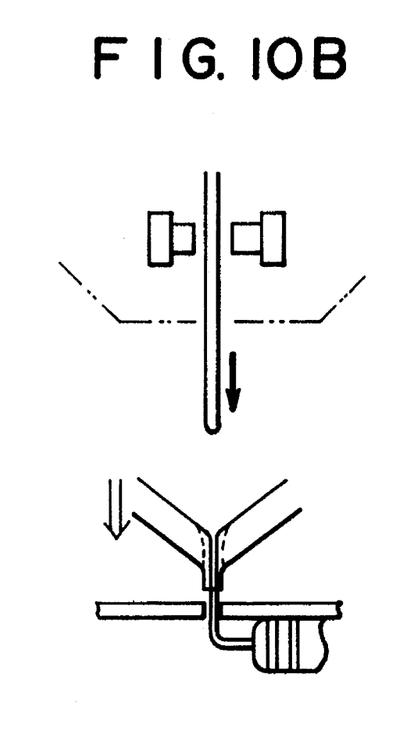
Figure 10C:
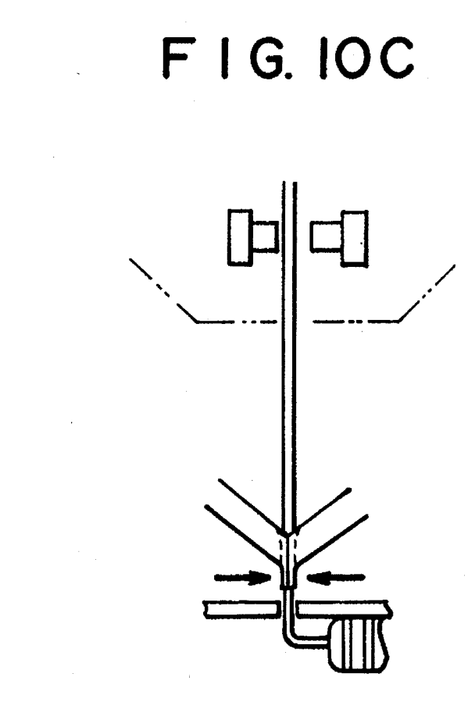
Figure 10D:
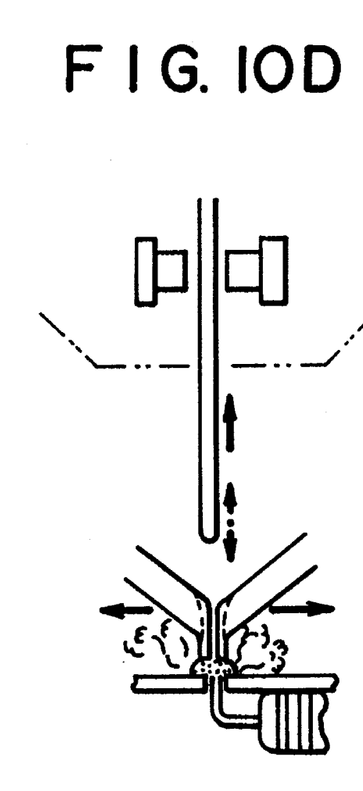
Figure 10E:
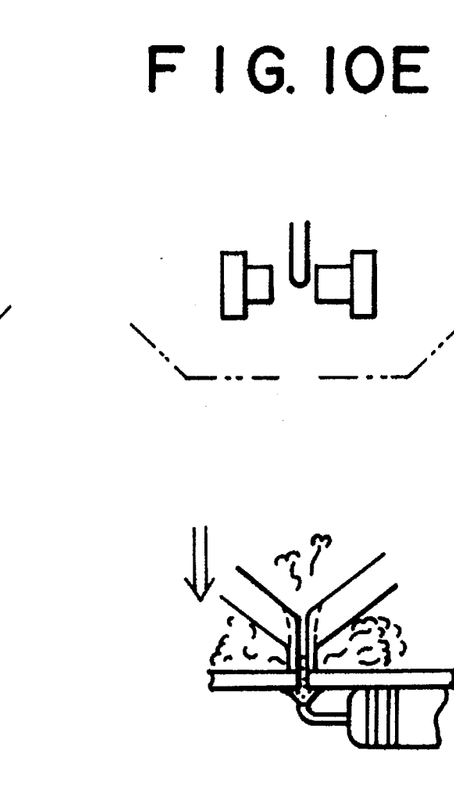
Figure 10F:
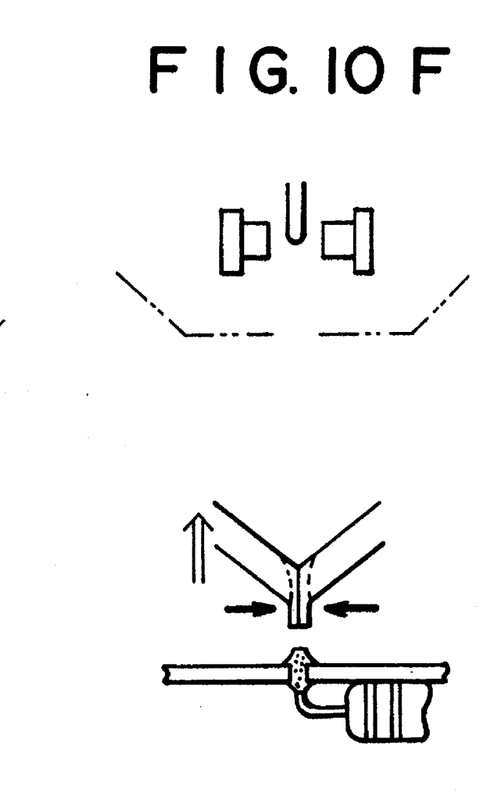

Initially, a desired portion of a workpiece, i.e. the lead wire 138, on which molten solder is applied, is placed beneath the assembled trowel members 126. The tip-end of the wire solder 60 is sensed by the sensors 84 and positioned at the position of the sensors 84 as shown in FIG. 10A. The trowel members 126 are closely retained with their end faces engaging with each other.

On reception of a start signal, the controller 134 actuates the trowel members 126A, 126B to start heating and to be separated by a small gap (see FIG. 10A). The motor 28 is actuated to lower the upper movable plate 20 so that the trowel members 126 are positioned to become ready for grasping the end of the lead wire 138. At the same time, the motor 70 is actuated to feed the wire solder 60 downwards (see FIG. 10B).

The wire solder 60 runs through between the rollers 72, 72 and between the running belts 62, 62 to be straightened, and advances vertically downwards from the running belts 62, 62. A feed of the wire solder 60 is a total of a distance travelled by the tip-end of the wire solder 60 from the sensors 84 to the solder melting pot 132 and a length of the wire solder 60 corresponding to a volume of solder to be fed.

When the wire solder 60 is fed, the trowel members 126 come closer with each other to grasp the end of the lead wire 138 and thereby the end of the lead wire 138 is heated. The foremost tip-end of the wire solder 60 abuts on the solder melting pot 132, and the wire solder 60 melts continuously from its tip-end as the wire solder 60 is fed continuously. The molten solder collects in the solder melting pot 132 (see FIG. 10C).

On completion of feeding a predetermined volume of the wire solder 60, the running belts 62, 62 run in reverse to raise the wire solder 60. In order to shake off remaining molten solder from the tip-end of the wire solder 60 thereby to allow the remaining molten solder to drop into the solder melting pot 132, the fore-and lowermost tip-end of the wire solder 60 is vibrated. This can be attained, for example, by finely alternating running directions of the running belts 62, 62.

After the lapse of a predetermined time duration for additional heating the molten solder to a desired constant temperature, the controller 134 actuates the motor 144 to rotate the cam 118, whereby the trowel member carrier plates 112 are pushed outwardly to separate the trowel members 126. Whereupon, the molten solder contained in the solder melting pot 132 formed by the grooves 130 of the opposing trowel members 126 drops onto the workpiece 138 to effect soldering (see FIG. 10D). By opening and closing the trowel members 126 repeatedly, dropping of the molten solder is ensured.

The controller 134 instructs a solder drop timer to begin counting of time duration during the trowel members 126 being separated to drop the molten solder. After the lapse of a pre-set time duration counted by the solder drop timer, the trowel members 126 are lowered again to a second lowered position (see FIG. 10E). The molten solder stuck to the lead wire 138 and forming a semi-spherical mass below the trowel members 126 is pressed by the bottom ends of the trowel members 126. Upon pressing by the bottom ends of the trowel members 126, the molten solder is pushed into the through-hole and allowed to stick to the lead wire 138 and the through-hole more intimately.

The time duration for holding the trowel members 126 at the second lowered position is counted by a heat timer. After the lapse of a pre-set time duration, the trowel members 126 are raised and then closed after the lapse of a certain time to be ready for the next operation (see FIG. 10F). During the operation sequence, the tip-end of the wire solder 60 returns to the position of the sensors 84 to stand by for the next operation.

Another embodiment of a feeder assembly according to the invention will now be described with reference to FIG. 11. The feeder assembly 42A comprises a pair of endless running belts 62A, 62A which feed the wire solder 60 along a vertical line by holding it therebetween and another pair of endless running belts 62B, 62B which are located at the upper side of the running belts 62A, 62A to feed the wire solder 60 by holding it therebetween. The running belts 62B, 62B are oriented perpendicular to the running belts 62A, 62A.

Figure 11:
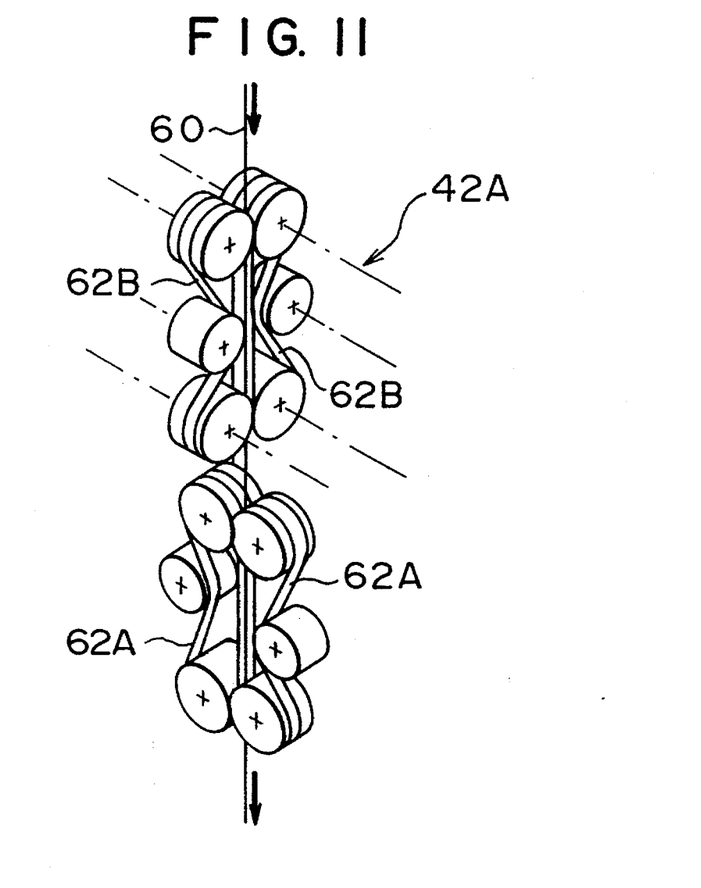
FIG. 11 is a conceptual diagram showing how another embodiment of the feeder assembly according to the invention works.

According to the feeder assembly 42A shown in FIG. 11, in order to straighten the wire solder 60, a bend of the wire solder 60 is cured or corrected in two directions perpendicular to each other. Thus, the feeder assembly 42A of FIG. 11 straightens the wire solder 60 more precisely than the feeder assembly 42 used in the embodiment of the invention explained in FIGS. 1 to 10. However, an embodiment of the present invention may use at least one pair of running belts for straightening the wire solder.

Figure 12:
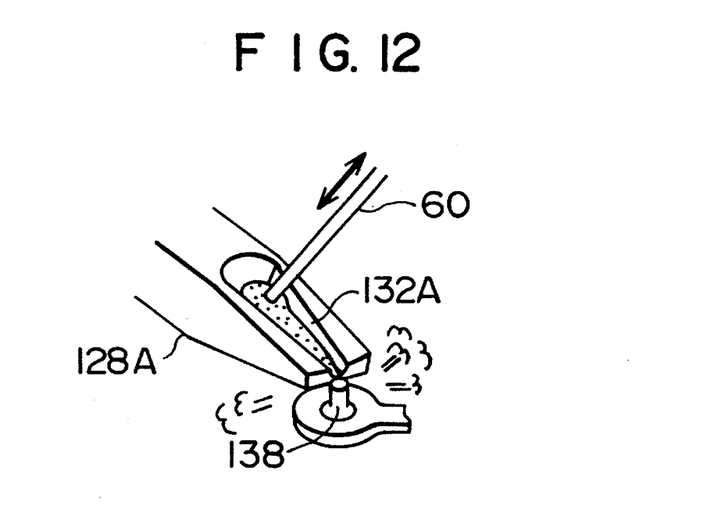
FIG. 12 is a perspective view showing another embodiment of a soldering iron having the solder melting pot according to the invention.

FIG. 12 is a perspective view of another embodiment of a soldering iron having a solder melting pot according to the invention. A trowel member 128A serves as a soldering iron by itself and has a groove in its top face to define a solder melting pot 132A. The wire solder 60 is fed toward the solder melting pot 132A from above or from obliquely above, and abuts on the solder melting pot 132A to melt from its tip-end. On completion of feeding a predetermined volume of solder, the wire solder 60 retracts upwards.

The solder melting pot 132A of the soldering iron 128A may be formed with a slope or slant to allow molten solder to spontaneously flow down the slope and to flow out from a beak thereof. Also, the soldering iron 128A as a whole may be tiltable. In this case, molten solder is temporarily retained in the solder melting pot 132A for additional heating, and then the soldering iron 128A is tilted to allow the molten solder to flow out from a beak. Preferably, the soldering iron 128A is brought in contact with a workpiece (the lead wire 138 for example) to preliminarily heat it, and then molten solder is permitted to flow down to a soldering portion of the workpiece.

As has been described above, according to the present invention, at least one pair of endless running belts hold the wire solder therebetween to straighten the wire solder and to feed the straightened wire solder to the solder melting pot. The foremost tip-end of the wire solder abuts on the solder melting pot to melt therefrom, and on completion of feeding a predetermined volume of the wire solder, the wire solder retreats to a standby position. Accordingly, the volume of solder to be fed can be controlled by controlling a feed of the wire solder, and hence a predetermined volume of solder can be precisely fed. This allows a small volume of molten solder heated to a proper temperature can be applied to a workpiece with a resultant improvement in soldering reliability.

A sensor is provided near the running belts on the side of a wire solder feeding end thereof to sense the tip-end of the wire solder for feeding the wire solder from the sensor position to the solder melting pot, whereby the sensor is hard to get smudged by smoke generated from molten solder. When the wire solder retreats from the solder melting pot, the wire solder is vibrated to shake off remaining molten solder from its tip-end, whereby the volume of molten solder to be supplied to the solder melting pot can be controlled more precisely.

Also, the invention provides a soldering apparatus used directly for carrying out the invented soldering method. Preferably, sensor is provided near the running belts on the side of a wire solder feeding end thereof to sense the tip-end of the wire solder for retracting the tip-end of the wire solder to the sensor position. The solder melting pot may be defined by engaging plural trowel members with each other or may be defined by a groove cut in one soldering iron.

Furthermore, in addition to a pair of running belts, the feeder assembly may be provided with a pair of rollers or another pair of running belts on the upstream side of the running belts, which additional rollers or belts are oriented perpendicular to the lower running belts for holding the wire solder therebetween, whereby the linearity of the wire solder improves more.

Preferably, the feeder assembly is held movably in the vertical direction and suspended by spring means such as a coil spring. In such a construction, even when the feeder assembly continues feeding the wire solder before the tip-end of the wire solder abutting on the solder melting pot begins to melt, the feeder assembly suspended by spring means is easily pushed up by a small force, thereby preventing the wire solder to bend. Once the wire solder begins to melt from the lowermost tip-end, the feeder assembly lowers naturally, and thus the wire solder continues melting while a proper force is continuously imposed on the tip-end of the wire solder.

What is claimed is:

1. A soldering method comprising the steps of supplying a predetermined volume of solid solder to a solder melting pot, heating and melting the solder in said solder melting pot, and then dropping the molten solder onto a workpiece, wherein a wire solder is held between at least one pair of endless running belts which run with opposed faces thereof in contact with each other thereby to straighten the wire solder, wherein a fore tip-end of the straightened wire solder fed by the running belts is abutted and pressed against said solder melting pot to melt the wire solder from the tip-end, and wherein on completion of feeding a predetermined volume of the wire solder to said solder melting pot, said running belts are run in reverse to retreat the tip-end of the wire solder from said solder melting pot.

2. The soldering method according to claim 1, wherein a sensor is provided near said running belts on the side of a wire solder feeding end thereof for sensing the tip-end of the wire solder, and wherein after feeding the wire solder by a total length of the distance between said sensors and said solder melting pot and a length of the solder wire corresponding to a predetermined feed of solder, the tip-end of the wire solder is retreated to the position of said sensor.

3. The soldering method according to claim 2, wherein the wire solder is vibrated at an early stage of the step of retreating the tip-end of the wire solder from said solder melting pot to the position of said sensor.

4. A soldering apparatus which carries out the steps of feeding a predetermined volume of solid solder to a solder melting pot, heating and melting the solder in said pot, and then dropping the molten solder onto a workpiece, said apparatus comprising:

a feeder assembly for feeding a wire solder to said solder melting pot and comprising at least one pair of endless running belts which run with opposed faces thereof in contact with each other, said wire solder being held between said running belts and straightened along with the feeding operation of said wire solder by said running belts, thus straightened wire solder being fed to said solder melting pot; and a controller which controls said running belts to feed the tip-end of the wire solder to said solder melting pot, to further feed the wire solder by a length corresponding to a predetermined feed of solder, and then to retreat the wire solder.

5. The soldering apparatus according to claim 4, wherein said feeder assembly is provided with a sensor near a wire solder feeding end thereof for sensing the tip-end of the wire solder fed therefrom and wherein said controller controls said running belts to retreat the wire solder to the position of said sensor after feeding the predetermined volume of the wire solder.

6. The soldering apparatus according to claim 4, wherein said solder melting pot is formed by engaging plural trowel members, each of said trowel members having a surface made of a solder repellent material, at least of a portion contacting with the solder, and wherein said plural trowel members are separated to allow the molten solder to drop onto the workpiece.

7. The soldering apparatus according to claim 4, wherein said solder melting pot is defined by a groove cut in one soldering iron.

8. The soldering apparatus according to claim 4, wherein said feeder assembly further comprises a pair of rollers for holding the wire solder therebetween, said pair of rollers being provided near said running belts on the upstream side thereof and being oriented perpendicular to said running belts.

9. The soldering apparatus according to claim 4, wherein said at least one pair of endless running belts is two pairs of running belts which are arranged in a tandem manner and which are oriented perpendicular to each other for holding the wire solder therebetween.

10. The soldering apparatus according to claim 4, wherein said feeder assembly is held movably in the vertical direction and suspended by spring means, thereby reducing a load which the tip-end of the wire solder fed from said feeder assembly applies to said solder melting pot as a result of abutting thereon and thus preventing the wire solder from bending.

* * * * *